US008509062B2

(12) United States Patent
Arseneault et al.

(10) Patent No.: US 8,509,062 B2
(45) Date of Patent: Aug. 13, 2013

(54) SMART ETHERNET EDGE NETWORKING SYSTEM

(75) Inventors: Jim Arseneault, Woodlawn (CA); Chris Barrett, Nepean (CA); Pablo Frank, Ottawa (CA); Brian Smith, Ottawa (CA)

(73) Assignee: Ciena Corporation, Hanover, MD (US)

( * ) Notice: Subject to any disclaimer, the term of this patent is extended or adjusted under 35 U.S.C. 154(b) by 676 days.

(21) Appl. No.: 11/500,052

(22) Filed: Aug. 7, 2006

(65) Prior Publication Data

US 2008/0031129 A1  Feb. 7, 2008

(51) Int. Cl.
*H04L 12/26* (2006.01)
(52) U.S. Cl.
USPC .......................................... 370/224; 370/249
(58) Field of Classification Search
USPC ............................................ 370/223, 224, 249
See application file for complete search history.

(56) References Cited

U.S. PATENT DOCUMENTS

| | | | | |
|---|---|---|---|---|
| 5,398,234 | A * | 3/1995 | O'Connell et al. | 370/249 |
| 5,452,297 | A * | 9/1995 | Hiller et al. | 370/395.61 |
| 5,553,059 | A * | 9/1996 | Emerson et al. | 370/248 |
| 5,574,723 | A * | 11/1996 | Killian et al. | 370/384 |
| 5,778,003 | A * | 7/1998 | Puppa et al. | 714/716 |
| 5,859,837 | A | 1/1999 | Crayford | |
| 6,154,448 | A * | 11/2000 | Petersen et al. | 370/248 |
| 6,269,082 | B1 * | 7/2001 | Mawhinney et al. | 370/247 |
| 6,674,754 | B1 * | 1/2004 | Ofek | 370/389 |
| 6,680,913 | B1 * | 1/2004 | Malmivirta et al. | 370/249 |
| 6,904,286 | B1 | 6/2005 | Dantu | |
| 7,042,835 | B1 * | 5/2006 | de Boer et al. | 370/222 |
| 7,245,627 | B2 * | 7/2007 | Goldenberg et al. | 370/419 |
| 7,420,928 | B2 * | 9/2008 | Lobig | 370/248 |
| 7,519,004 | B1 * | 4/2009 | Kamity et al. | 370/248 |
| 2002/0181396 | A1 | 12/2002 | Chen et al. | |
| 2003/0058880 | A1 | 3/2003 | Sarkinen et al. | |
| 2003/0063560 | A1 | 4/2003 | Jenq et al. | |
| 2003/0112749 | A1 * | 6/2003 | Hassink et al. | 370/225 |
| 2003/0133406 | A1 | 7/2003 | Fawaz et al. | |
| 2003/0142629 | A1 * | 7/2003 | Krishnamurthi et al. | 370/249 |
| 2003/0147347 | A1 | 8/2003 | Chen et al. | |
| 2003/0156542 | A1 | 8/2003 | Connor | |

(Continued)

FOREIGN PATENT DOCUMENTS

EP       1124356 A2    8/2001
WO   WO 2004057817 A2   7/2004

*Primary Examiner* — Faruk Hamza
*Assistant Examiner* — Andrew Oh
(74) *Attorney, Agent, or Firm* — Clements Bernard PLLC; Christopher L. Bernard; Lawrence A. Baratta, Jr.

(57) ABSTRACT

A telecommunications system includes a network for transporting packets on a path between selected subscriber end points. The network has multiple nodes connected by links, with each node (a) pairing the forward and backward paths of a connection and (b) allowing for the injection of messages in the backward direction of a connection from any node in the path without needing to consult a higher OSI layer. A system is also provided for protecting connection paths for transporting data packets through an Ethernet telecommunications network having a multiplicity of nodes interconnected by a multiplicity of links. Primary and backup paths are provided through the network for each of multiple connections, with each path including multiple links. Data packets arriving at a first node common to the primary and backup paths are duplicated, and one of the duplicate packets is transported over the primary path, the other duplicate packet is transported over the backup path, and the duplicate packets are recombined at a second node common to the primary and backup paths.

19 Claims, 9 Drawing Sheets

(56) References Cited

U.S. PATENT DOCUMENTS

| | | | |
|---|---|---|---|
| 2003/0231632 A1* | 12/2003 | Haeberlen | 370/395.5 |
| 2004/0037223 A1 | 2/2004 | Harrison et al. | |
| 2004/0081090 A1 | 4/2004 | Hara et al. | |
| 2004/0151181 A1 | 8/2004 | Chu et al. | |
| 2004/0156310 A1* | 8/2004 | Fredette et al. | 370/216 |
| 2004/0156345 A1 | 8/2004 | Steer et al. | |
| 2004/0170179 A1 | 9/2004 | Johansson et al. | |
| 2004/0170186 A1 | 9/2004 | Shao et al. | |
| 2005/0007960 A1* | 1/2005 | Chen et al. | 370/249 |
| 2005/0008014 A1 | 1/2005 | Mitra et al. | |
| 2005/0073961 A1* | 4/2005 | Paik et al. | 370/252 |
| 2005/0111418 A1* | 5/2005 | Yang et al. | 370/338 |
| 2005/0141523 A1 | 6/2005 | Yeh et al. | |
| 2005/0152269 A1 | 7/2005 | Liu | |
| 2005/0201273 A1* | 9/2005 | Shimizu | 370/216 |
| 2005/0220033 A1* | 10/2005 | DelRegno et al. | 370/249 |
| 2005/0243711 A1 | 11/2005 | Alicherry et al. | |
| 2005/0259589 A1* | 11/2005 | Rozmovits et al. | 370/249 |
| 2005/0262264 A1* | 11/2005 | Ando et al. | 709/233 |
| 2005/0265365 A1* | 12/2005 | Wan | 370/401 |
| 2006/0045021 A1* | 3/2006 | Deragon et al. | 370/249 |
| 2006/0126496 A1* | 6/2006 | Filsfils et al. | 370/216 |
| 2006/0203717 A1* | 9/2006 | Puppa et al. | 370/216 |
| 2006/0274750 A1* | 12/2006 | Babbar et al. | 370/390 |
| 2007/0121486 A1* | 5/2007 | Guichard et al. | 370/216 |
| 2007/0180104 A1* | 8/2007 | Filsfils et al. | 709/224 |

* cited by examiner

SMART ETHERNET EDGE NETWORKING SYSTEM

FIELD OF THE INVENTION

The present invention generally relates to Ethernet access and, in particular, to bandwidth efficient Ethernet grid networking systems.

BACKGROUND OF THE INVENTION

Ethernet is rapidly becoming the protocol of choice for consumer, enterprise and carrier networks. It is expected that most networks will evolve such that Ethernet will be the technology used to transport all the multimedia applications including, for example, triple-play, fixed-mobile-convergence (FMC), and IP multimedia sub-systems (IMS). Existing network elements which offer network access using Ethernet technology are not designed to make maximum use of the legacy network links existing at the edge of the carrier networks. The edge of the network is quickly becoming a bottleneck as the new applications are becoming more and more demanding for bandwidth.

Telecommunications carriers are constantly looking for new revenue sources. They need to be able to deploy rapidly a wide ranging variety of services and applications without the need to constantly modify the network infrastructure. Ethernet is a promising technology that is able to support a variety of application requiring different quality of service (QoS) from the network. The technology is now being standardized to offer different types of services which have different combinations of quality objectives, such as loss, delay and bandwidth. Bandwidth objectives are defined in terms committed information rate (CIR) or excess information rate (EIR). The CIR guarantees bandwidth to a connection while the EIR allows it to send at higher bandwidth when available.
Path Association Using MPLS, bidirectional connections are set up using two uni-directional tunnels. A concept of pseudo-wire has been standardized to pair the two tunnels at both end-points of the tunnels (see FIG. 1). However intermediate nodes are not aware of the pairing and treat the two tunnels independently. Furthermore, the routing mechanism does not attempt to route both connections through the same path. It is therefore impossible for a carrier to use operation administration and maintenance (OAM) packets, in order to create loopbacks within the connection path to troubleshoot a connection without setting up out-of-service explicit paths. There is therefore a need for a mechanism to make a unidirectional path look like a bi-directional path.

This capability existed in ATM and frame relay technologies because they were inherently connection-oriented and both paths of a connection (forward and backward) always went through the same route.

Carriers need the ability to set up flexible Ethernet OAM path in-service and out-of-service anywhere in the network in order to efficiently perform troubleshooting.
E-LINE Protection In order to provide reliable carrier-grade Ethernet services, the Ethernet technology has to be able to support stringent protection mechanisms for each Ethernet point-to-point (E-LINE) link.

There are two main types of protection required by a carrier, link protection and path protection. There are a number of standard link protection techniques in the marketplace, such as ring protection and bypass links which protect against a node going down. Generally connection oriented protocols such as MPLS use path protection techniques. Most path protection techniques assume a routed network where the routes are dynamically configured and protected based on the resource requirements.

One issue with all these existing protection protocols is that they do not take into account business policies, such as desired level of protection, for determining the protected path.

Another issue with the current way protection paths are set up is that they only trigger when intermediate nodes or links encounter failure. If the end-point outside of the tunnel, receiving the traffic fails, the source continues to send the traffic unaware of the failure, until application-level reaction is triggered, thus wasting precious bandwidth. Such reaction can take up to several minutes.
Zero-Loss Proctection Switching Some communication applications, such as medical and security applications, require a very reliable service. In these cases, a 50-ms switch over time may be inadequate due to the critical data lost during this time period. For example, a 50-ms switch over in a security monitoring application could be misconstrued as a "man-in-the-middle" attack, causing resources to be wasted resolving the cause of the "glitch."

SUMMARY OF THE INVENTION

One embodiment provides a telecommunications system comprising a network for transporting packets on a path between selected subscriber end points. The network has multiple nodes connected by links, with each node (a) pairing the forward and backward paths of a connection and (b) allowing for the injection of messages in the backward direction of a connection from any node in the path without needing to consult a higher OSI layer. In one implementation, each node switches to a backup path when one of the paired paths fails, and a new backup path is created after a path has switched to a backup path for a prescribed length of time.

In another embodiment, a system is provided for protecting connection paths for transporting data packets through an Ethernet telecommunications network having a multiplicity of nodes interconnected by a multiplicity of links. Primary and backup paths are provided through the network for each of multiple connections, with each path including multiple links. Data packets arriving at a first node common to the primary and backup paths are duplicated, and one of the duplicate packets is transported over the primary path, the other duplicate packet is transported over the backup path, and the duplicate packets are recombined at a second node common to the primary and backup paths.

BRIEF DESCRIPTION OF THE DRAWINGS

The invention will be better understood from the following description of preferred embodiments together with reference to the accompanying drawings, in which.

DETAILED DESCRIPTION

Path Association

Figure 1:
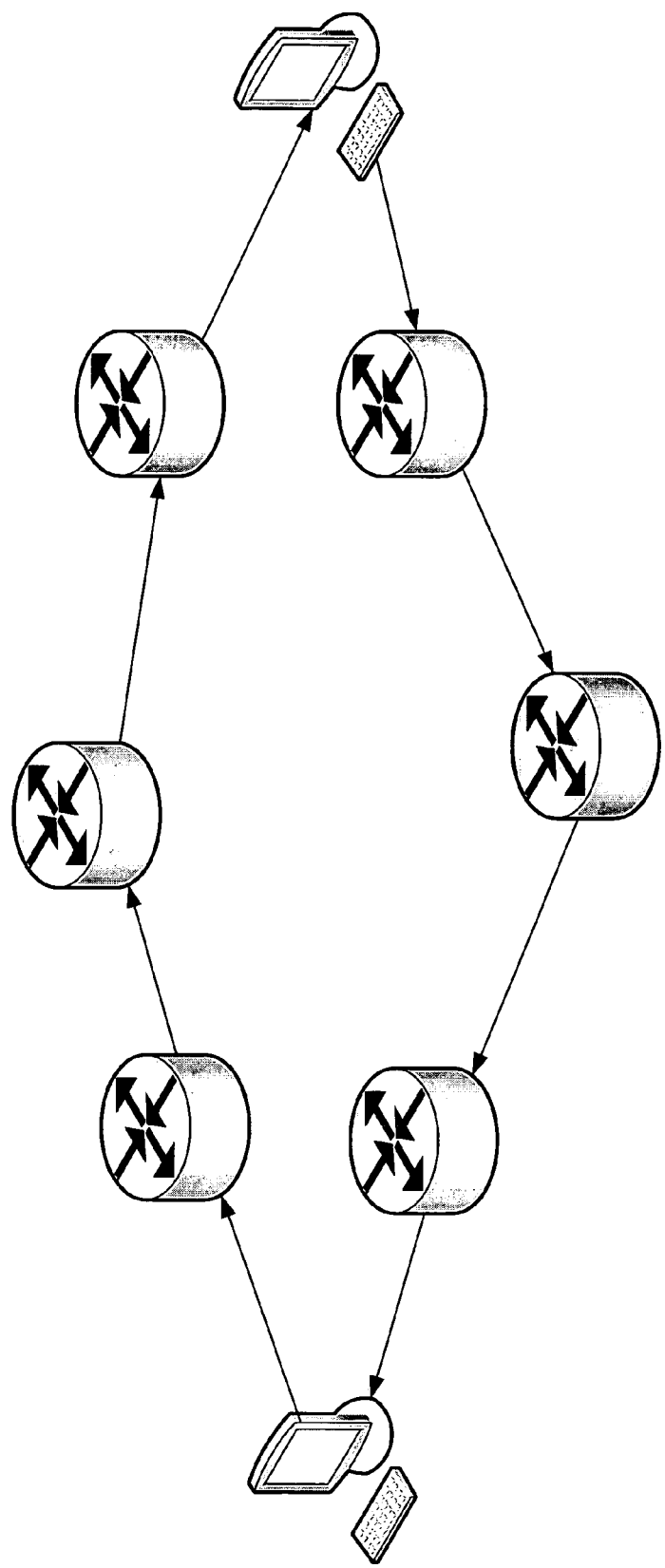
FIG. 1 illustrates a prior art network where both directions of the connections use different paths.
Figure 2:
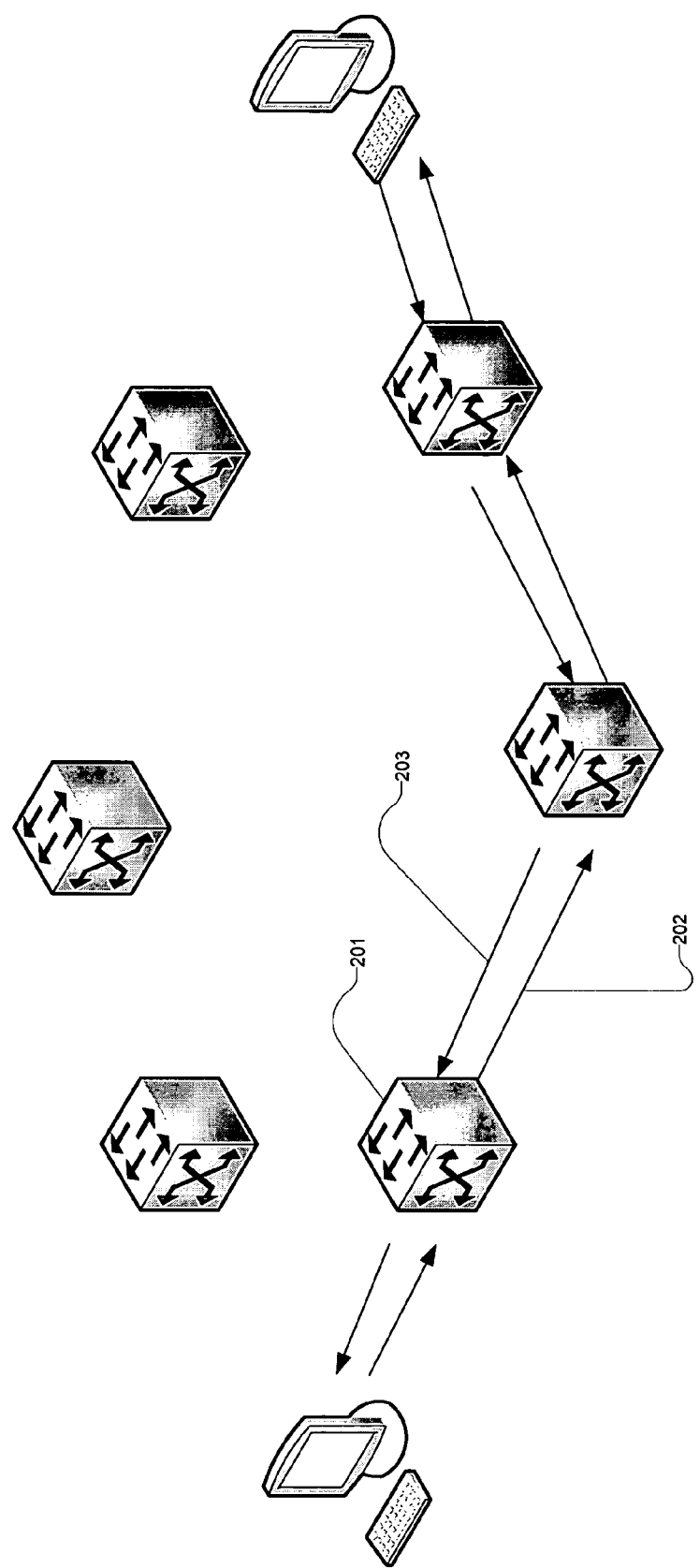
FIG. 2 illustrates an example where both directions of the connection use the same path.
Figure 3:
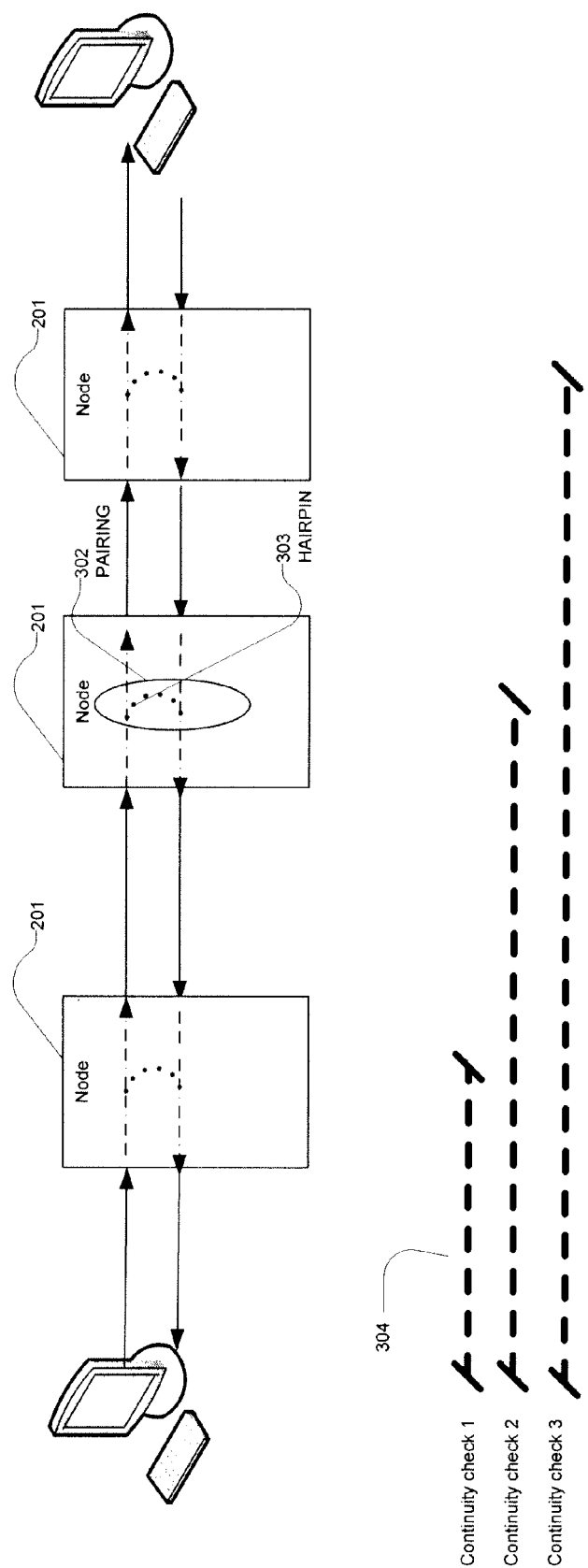
FIG. 3 illustrates the pairing of the connection at each node and the use of hairpins for continuity checking.

Given the ability of the VMS to ensure that each direction of the connection uses the same path (as per FIG. 2), each network element (e.g. WiMAX switch) is able to (1) pair each forward 202 and backward 203 path of a connection at each node in the path of a connection and (2) allow for injection of messages in the backward direction of a connection from any node in the path. This capability, depicted in FIG. 3, is referred to herein as creating a "hairpin" 303. The knowledge of the pairs at each node 201 allows creating loopbacks, and then using control packets at any point in a connection in order to perform troubleshooting. Loopbacks can also be created by the VMS or manually generated. The pairing is possible in this case because the VMS ensures that both paths of the connections (forward and backward) take the same route which is not currently the case for Ethernet Other examples of uses for this path association could be where two uni-directional paths with different characteristics are paired (such as different labels and traffic engineering information in the case of MPLS), or where a single backward path is used in the hairpin connections for multiple forward unidirectional paths.

The hairpin allows nodes in the network to send messages (such as port-state) back to their ingress point by sending packets back along the hairpin path without the need to hold additional information about the entire path without the need to consult higher level functions outside of the datapath, or to involve the transit end of the path. If the path is already bidirectional, no hairpin is required for pairing.

Using the hairpin to its full potential requires the use of a new subsystem referred to herein as a "packet treatment rule" or "rules" for short. These rules are assigned to an ingress interface and consist of two parts (FIG. 4a):

(1) ingress matching criteria 407: this is a check to see if the packet in question is to be acted upon or to simply pass though the rule subsystem with no action.

(2) an action mechanism 408 that is called if a packet does meet the criteria of a packet to be acted upon. An example of an action mechanism is where a rule was placed on an ingress interface looking for a prescribed bit-pattern within the packet. When the system receives a packet that matches the prescribed bit-pattern, the action mechanism is run. This action mechanism may be one that directs the system to send this packet back out the interface at which it was received after altering it in some way. All other packets pass through the system unaffected.

Rules can be placed at each node along a path to use the hairpin to loop-back one or more types of packet, or all packets crossing a port. Rules can also be activated by types of packets or other rules, allowing complicated rules that activate other rules upon receiving an activation packet or and deactivate rules on receiving a deactivation packet.

As exemplified in FIG. 3, the pairing 302 allows the system to create flexible in-service or out-of-service continuity checking at any node 201 in the path. Rule checking points can be set along a path from ingress to egress to allow continuity checks 304 at each hop along a path. Each rule can consist of looking for a different pattern in a packet, and only hairpin traffic matching that bit pattern, as defined in the ingress matching criteria 407 of each individual rule. The pattern or ingress matching criteria can consist of a special pattern in the header or the body of a packet, or any way to classify the packet against a policy to identify it should be turned around on the hairpin. This allows a network operator to check each hop while live traffic runs on the path and is unaffected (in-service loopback) or to provide an out-of-service loopback that sends all traffic back on the hairpin interfaces.

Figure 4:
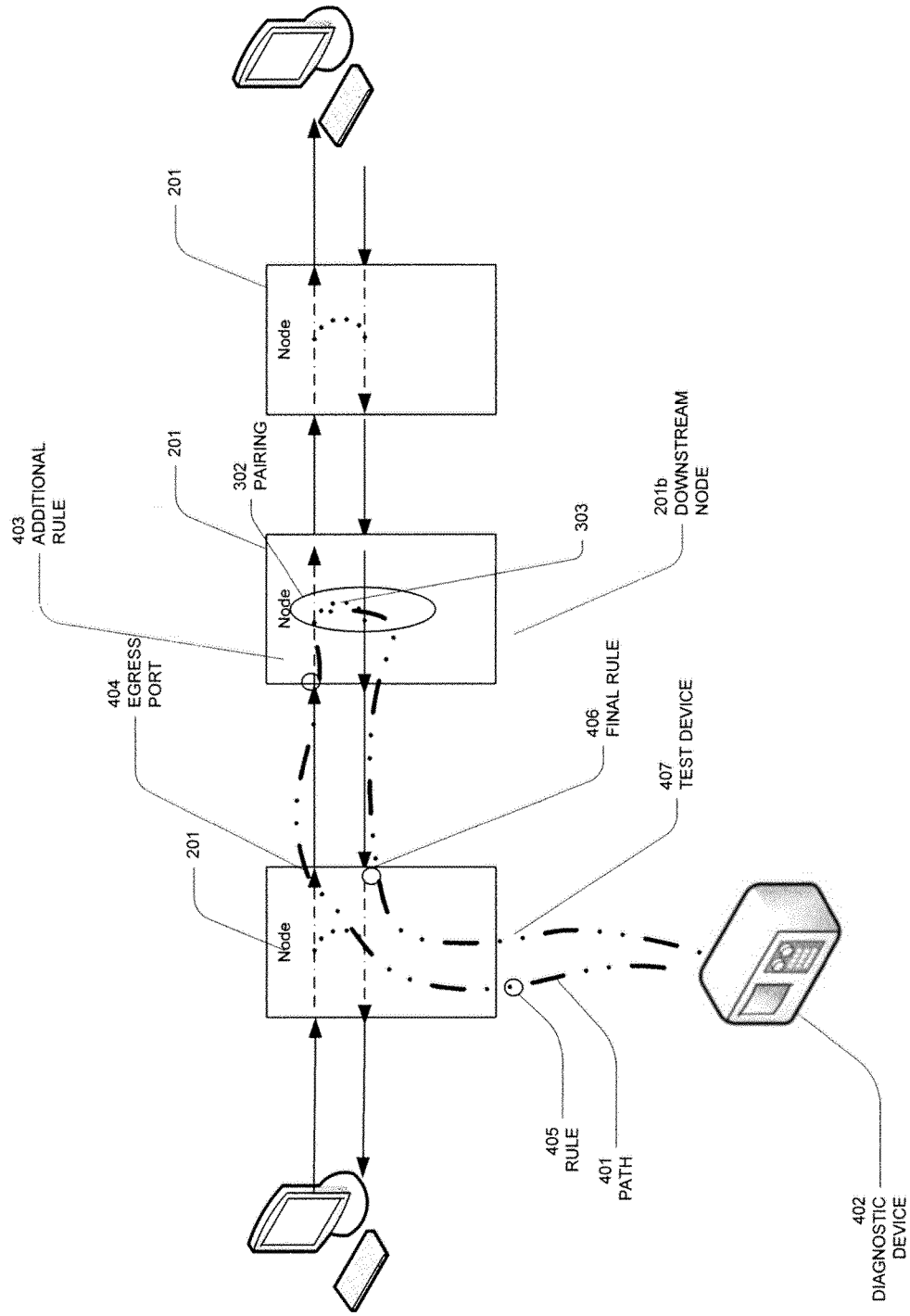
FIG. 4 illustrates the use of hairpins for creating path snakes.
Figure 4A:
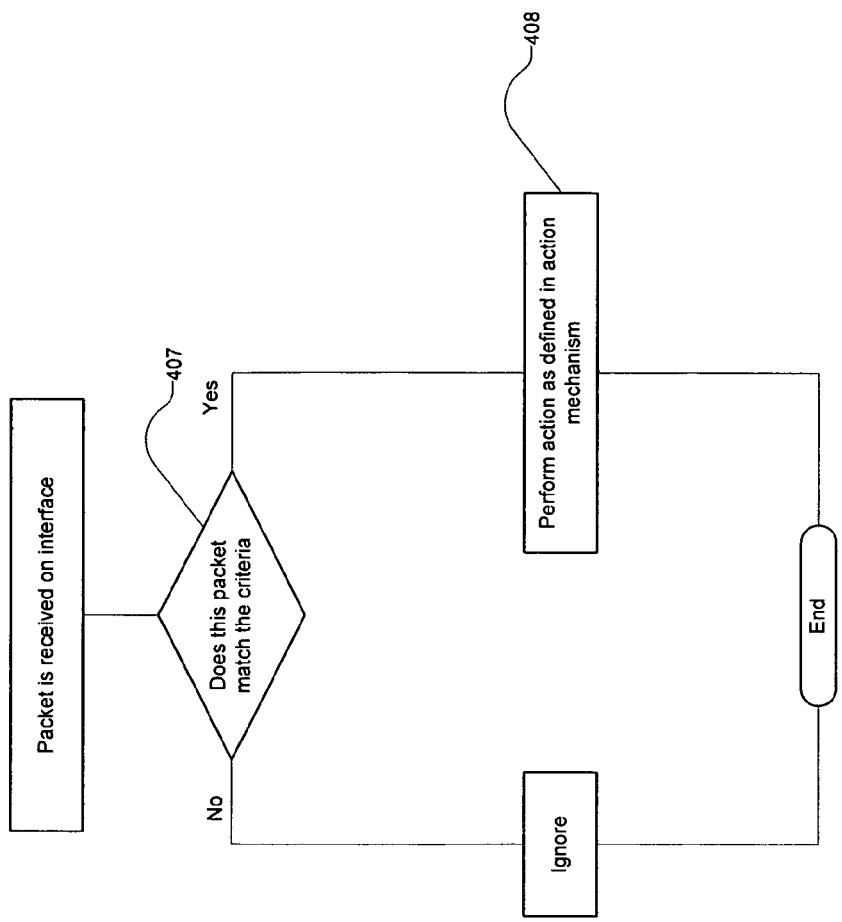
FIG. 4a illustrates the management of rules
Figure 5:
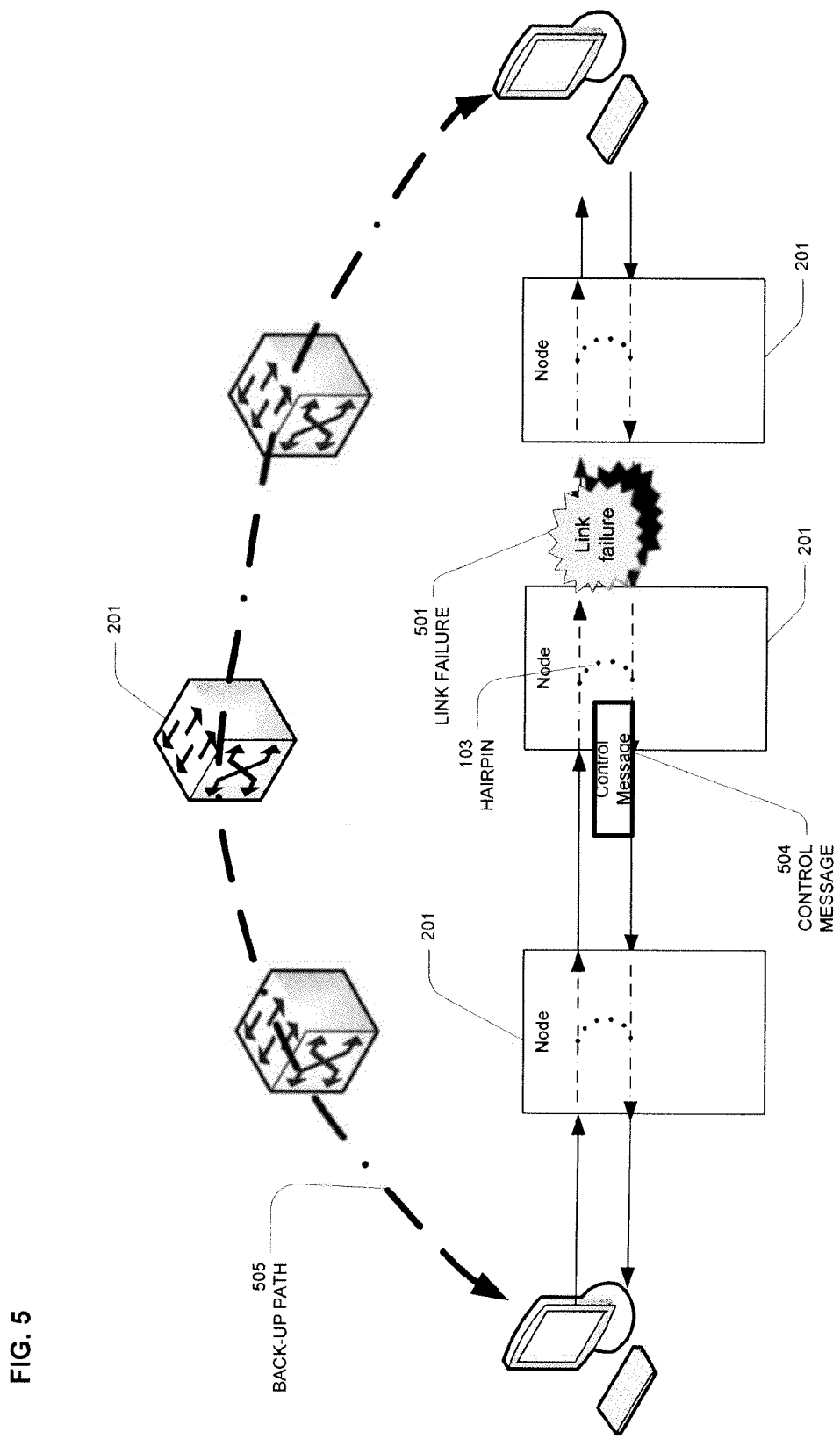
FIG. 5 Illustrates the use of control messages to trigger protection switching

The creation of path snakes is also easily implementable using hairpins (see FIG. 4). A snake of a path 401 can be created using a number of rules, e.g., one rule causing a specific type of packet to be put on a path that exists on the node, and then other rules directing that packet to other paths or hairpins on the node to allow a network operator to "snake" packets across a number of paths to test connectivity of the network. This also allows a test port with a diagnostic device 402 to be inserted into a node to source (inject) and receive traffic that does not require insertion on the ingress or egress of a path.

In the case of FIG. 4: a rule 405 is placed on the ingress port for a path 401 that sends all traffic, regardless of bit pattern, out a specific egress port 404 towards a downstream node 201b. An additional rule 403 placed on node 201 ingress port sends all traffic with a unique (but configurable) bit-pattern out the interface's hairpin back towards node 201. A final rule 406 sends all traffic matching the aforementioned unique bit pattern out the interface connected to the test device 407.

The hairpin is always available at each node for each connection. Rules can be enabled (and later disabled) to look for specific types of control messages (e.g., loop-back) and act on them.

Hairpins can also used for other mechanisms described below such as protection switching, network migration and flow control.

E-LINE Protection Configuration and Operation

One embodiment provides sub-50msec path protection switching for Ethernet point-to-point path failures in order to meet the reliability requirements of the carriers is without using a large amount of control messages. Furthermore, the back-up path is established and triggered based not only on available resources but also on business policies as described above.

The back-up path is calculated using the VMS, and not via typical signaling mechanisms, which configures the switches' 201 control plane with the protected path. The back-up path is set up by the VMS and does not require use of routing protocols such as OSPF. Once the back-up path is set up, the VMS is not involved in the protection switching. The process is illustrated in FIG. EP-1. When a node 201 detects a link failure 501 (via any well-known method, such as loss of signal), it creates a control message 504 and sends the message back along the system using the hairpin 303 (as described above) to indicate to the source endpoint of each connection using the failed link that they need to switch to the back-up path. The switching is then done instantaneously to the back-up path 505. If the uni-directional paths are MPLS-Label switched paths, the hairpin allows the system to send the message back to the path's origination point without the need to consult a higher-level protocol.

The node can use the same mechanisms to notify the sources that the primary path failure has been restored. Depending on the business policies set up by the carrier, the connection can revert to the primary path.

After a connection has been switched to a back-up path, the VMS is notified via messaging that the failure has occurred.

The VMS can be configured to make the current path the primary path and to recalculate a new back-up path for the connection after some predetermined amount of time has elapsed and the primary path was not restored (e.g., after 1 minute). The information about the new back-up path is then sent down to the nodes without impact to the current data flow, and the old configuration (failed path) is removed from the configuration. Alternatively, the VMS can also be configured to find a new primary path and send a notification for switch over. The backup protection path remains as configured previously.

If the a User-Network-Interface (UNI) or Network-Network-Interface (NNI) at an end-point of a path fails, the endpoint can also use hairpins to send a control message to the traffic source to stop the traffic flow until the failure is restored or a new path to the destination can be created by the VMS, which is notified of the failure via messaging.

Zero-Loss Protection Switching

Leveraging the E-line protection scheme, the Switch 201 can create duplicate packet streams using the active and the backup paths. Sequence numbers are used to re-combine the traffic streams and provide a single copy to the server application. If the application does not provide native sequence numbers, they are added by the system.

Figure 6:
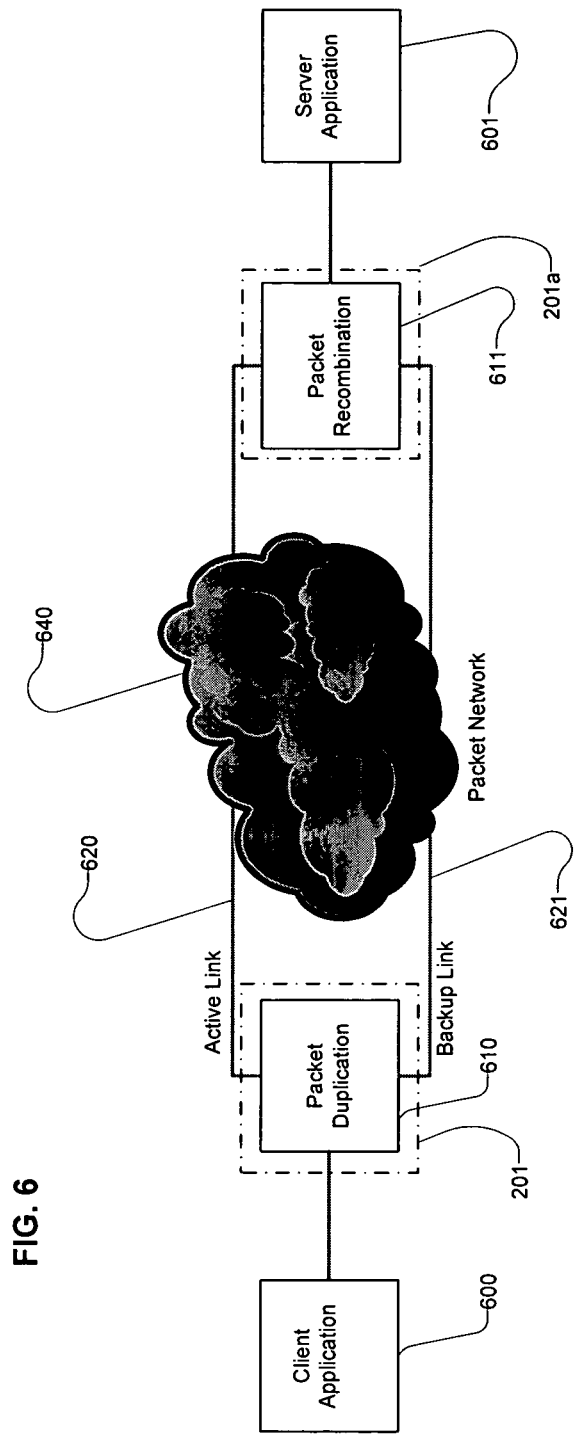
FIG. 6 illustrates the ability to duplicate packets to ensure zero-loss for a path.

One implementation of this behavior is shown in FIG. 6. In this figure, a client application 600 has a stream of packets destined for a server application 601. A packet duplication routine 610 creates two copies of the packets sourced by the client application 600. A sequence number is added to these duplicate packets, and one copy is sent out on an active link 620 and another is sent out on a backup link 621.

Figure 7:
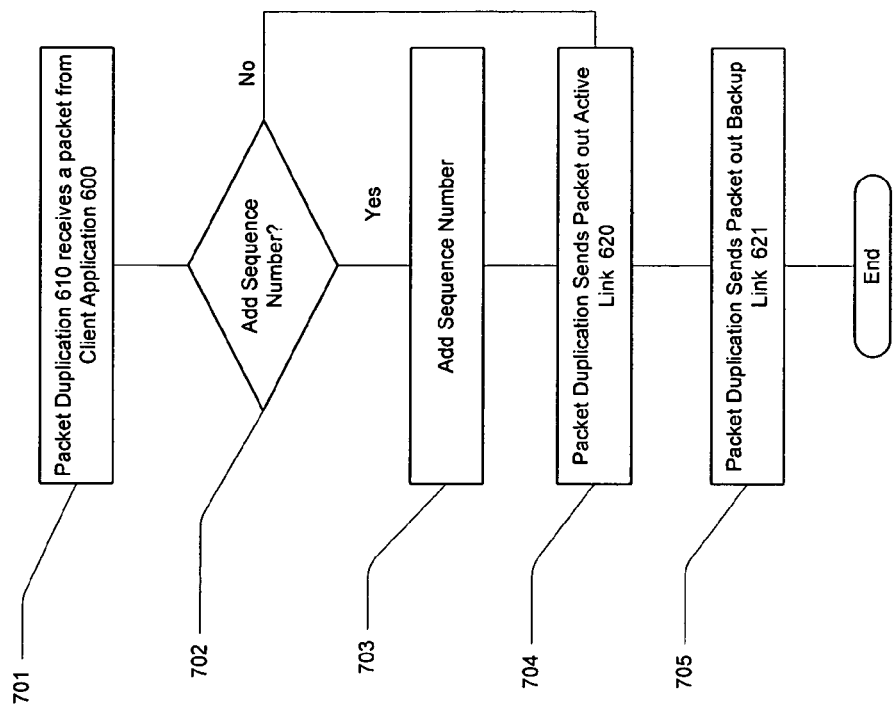
FIG. 7 illustrates one example of an implementation of a packet duplication algorithm.

One example of a packet duplication routine is depicted in FIG. 7. A packet is received at the packet duplication system 701 from a Client Application 600. The packet is examined by the system 702, which determines whether an appropriate sequence number is already contained in the packet (this is possible if the packet type is known to contain sequence numbers, such as TCP). If no well-known sequence number is contained in the packet, a sequence number is added by the packet duplication system 703. The packet is then duplicated 704 by being sent out both links, 620 and 621, first on the active link 704 and then on the back-up link 705. If there is no need to add a sequence number 702, because the packet already contains such a number, the routine proceeds to duplicate the packet 704.

A packet recombination routine 611 listens for the sequenced packets and provides a single copy to the server application 601. It removes the sequence numbers if these are not natively provided by the client application 600 data.

Figure 8:
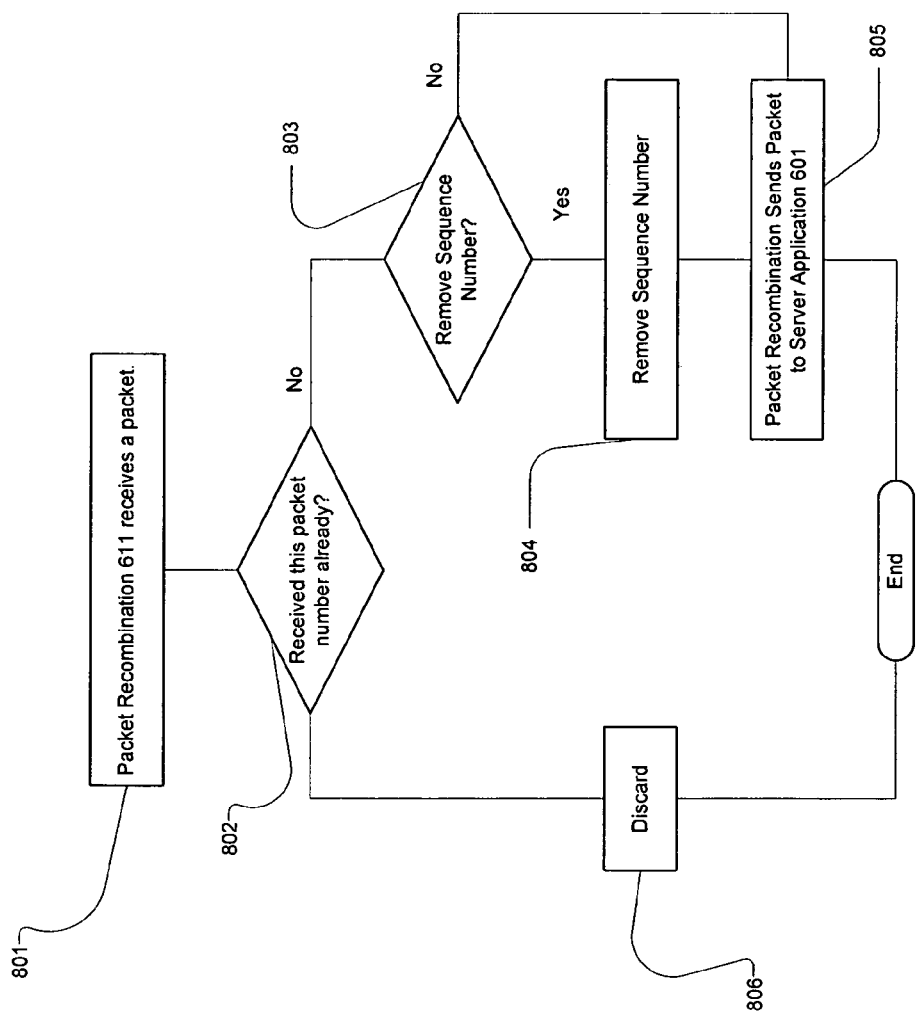
FIG. 8 illustrates one example of a packet recombination algorithm.

One example of a packet recombination routine is shown in FIG. 8. In this case a packet is received 801 by the packet recombination system 611 from the packet duplication system 610. The system examines the sequence number and determines if it has received a packet with the same sequence number before 802. If it has not received a packet with this sequence number before, the fact that is has now received a packet with this sequence number is recorded. If the sequence number was added by the packet duplication system 803 then this sequence number is now removed from the packet and the packet system sends the packet to the Server Application 804. If the sequence number was not added by the packet duplication system 600, then the packet is sent to the Server Application 601 unchanged 805. If a new packet is received by the packet recombination system 802 with a sequence number that was recorded previously, then the packet is immediately discarded as it is known to be a duplicate 806.

This system does the duplication at the more relevant packet level as opposed to the bit level of other previous implementations (as data systems transport packets not raw bit-streams) and that both streams are received and examined, with a decision to actively discard the duplicate packet after it has been received at the far end. Thus, a switch or link failure does not result in corrupted packets while the system switches to the other stream, because the system simply stops receiving duplicated packets.

Those skilled in the art will recognize that various modifications and changes could be made to the invention without departing from the spirit and scope thereof. It should therefore be understood that the claims are not to be considered as being limited to the precise embodiments set forth above, in the absence of specific limitations directed to each embodiment.

What is claimed is:

1. A telecommunications system comprising
   a network for transporting Ethernet packets on a path between selected subscriber end points, said network having multiple nodes connected by links, with each intermediate node,
   (a) pairing a unidirectional connection-oriented MPLS-Label-switched forward path and a unidirectional connection-oriented MPLS-Label-switched backward path, both said forward and backward paths reaching the same subscriber end points of a connection and configured to use the same set of nodes and links, wherein each intermediate node comprises a hairpin between the forward and backward paths, and
   (b) allowing for the injection of control messages in said backward path from any intermediate node in the path via the hairpin without said control messages needing to hold additional information about said forward and backward paths due to said pairing and without needing to consult a higher OSI layer or involving a transit end comprising one of the subscriber end points,
   wherein each intermediate node comprises one or more rules assigned to an ingress interface of the node, wherein the one or more rules identify specific packets to be acted on using ingress matching criteria associated with the one or more rules, and wherein the specific packets to be acted on are looped-back via the hairpin using action mechanisms associated with the one or more rules,
   wherein the one or more rules comprise one or more of a rule that sends traffic out a specific egress interface to a downstream node regardless of bit pattern, a rule that sends traffic with a unique bit pattern out the hairpin to an upstream node, and a rule that sends traffic with the unique bit pattern out an interface to a test device, and
   wherein the one or more rules are selectively enabled and disabled to look for and act on specific types of control messages.

2. The telecommunications system of claim 1 in which said paired forward and backward paths have different characteristics, said different characteristics comprising different labels and traffic engineering information.

3. The telecommunications system of claim 1 in which a single backward path is paired with multiple forward paths.

4. The telecommunications system of claim 1 in which each node includes a packet treatment rule applied to said injected control messages that allows snakes and jitter testing.

5. The telecommunications system of claim 1 in which each node includes means for switching to a backup path comprising paired unidirectional forward and backward paths when one of the paired paths fails.

6. The telecommunications system of claim 1 further comprising a plurality of rules operated at each node and configured to determine use of the hairpin for one or more types of packet or all packets crossing a port.

7. The telecommunications system of claim 1 wherein said injected control messages comprise port-state messages.

8. The telecommunications system of claim 1 wherein said injected control messages are configured to perform continuity checking.

9. A telecommunications method comprising
transporting Ethernet packets through a network on a path between selected subscriber end points, said network having multiple nodes connected by links, and
at each intermediate node (a) pairing unidirectional connection-oriented MPLS-Label-switched forward and backward paths of a connection, (b) configuring said forward and backward paths to use the same set of nodes and links, wherein each intermediate node comprises a hairpin between the forward and backward paths, and (c) allowing for the injection of control messages in the backward direction of a connection from any intermediate node in the path via the hairpin without said control messages needing to hold additional information about said forward and backward paths due to said pairing and without consulting a higher OSI layer or involving a transit end comprising one of the subscriber end points,
wherein each intermediate node comprises one or more rules assigned to an ingress interface of the node, wherein the one or more rules identify specific packets to be acted on using ingress matching criteria associated with the one or more rules, and wherein the specific packets to be acted on are looped-back via the hairpin using action mechanisms associated with the one or more rules,
wherein the one or more rules comprise one or more of a rule that sends traffic out a specific egress interface to a downstream node regardless of bit pattern, a rule that sends traffic with a unique bit pattern out the hairpin to an upstream node, and a rule that sends traffic with the unique bit pattern out an interface to a test device, and
wherein the one or more rules are selectively enabled and disabled to look for and act on specific types of control messages.

10. The telecommunications method of claim 9 in which said paired forward and backward paths have different characteristics, said different characteristics comprising different labels and traffic engineering information.

11. The telecommunications method of claim 9 in which a single backward path is paired with multiple forward paths.

12. The telecommunications method of claim 9 in which each node includes a packet treatment rule applied to said injected control messages that allows snakes and jitter testing.

13. The telecommunications method of claim 9 in which each node includes means for switching to a backup path comprising paired unidirectional forward and backward paths when one of the paired paths fails.

14. The telecommunication system of claim 13 in which a new backup path comprising paired unidirectional forward and backward paths is created after a path has switched to a backup path for a prescribed length of time.

15. The method of claim 9 further comprising implementing a plurality of rules operated at each node and configured to determine use of the hairpin for one or more types of packet or all packets crossing a port.

16. The method of claim 9 wherein said injected control messages comprise port-state messages.

17. The method of claim 9 wherein said injected control messages are configured to perform continuity checking.

18. An Ethernet network comprising
multiple nodes connected by links, two of said multiple nodes comprising subscriber end points transporting Ethernet packets on a path;
wherein one or more of said multiple nodes comprise intermediate nodes on said path, each intermediate node configured to perform steps of:
pairing a unidirectional connection-oriented forward path and a unidirectional connection-oriented backward path providing bi-directional transport of said Ethernet packets on said path,
ensuring both said forward and backward paths reaching the same subscriber end points using a same set of nodes and links, wherein each intermediate node comprises a hairpin between the forward and backward paths, and
injecting control messages in said backward path from any intermediate node in the path via the hairpin to provide continuity check of said forward and backward paths without said control messages needing to hold additional information about said forward and backward paths due to said pairing and said ensuring and without needing to consult a higher layer or involving a transit end comprising one of the subscriber end points;
wherein each intermediate node comprises one or more rules assigned to an ingress interface of the node, wherein the one or more rules identify specific packets to be acted on using ingress matching criteria associated with the one or more rules, and wherein the specific packets to be acted on are looped-back via the hairpin using action mechanisms associated with the one or more rules,
wherein the one or more rules comprise one or more of a rule that sends traffic out a specific egress interface to a downstream node regardless of bit pattern, a rule that sends traffic with a unique bit pattern out the hairpin to an upstream node, and a rule that sends traffic with the unique bit pattern out an interface to a test device, and
wherein the one or more rules are selectively enabled and disabled to look for and act on specific types of control messages.

19. The Ethernet network of claim 18 wherein said paired forward and backward paths have different characteristics, said different characteristics comprising different labels and traffic engineering information.

\* \* \* \* \*